(12) United States Patent
Perlman et al.

(10) Patent No.: US 6,677,856 B2
(45) Date of Patent: Jan. 13, 2004

(54) WIRELESS REMOTE VEHICLE SIGNAL INDICATOR FOR SUPPLEMENTING EXISTING VEHICLE SIGNAL INDICATORS

(76) Inventors: Richard I. Perlman, 4698-A Alvarado Canyon Rd., San Diego, CA (US) 92120; Norman G. Looper, 4357 30th St., San Diego, CA (US) 92104-1313

( * ) Notice: Subject to any disclaimer, the term of this patent is extended or adjusted under 35 U.S.C. 154(b) by 67 days.

(21) Appl. No.: 09/989,918

(22) Filed: Nov. 20, 2001

(65) Prior Publication Data

US 2003/0095041 A1 May 22, 2003

(51) Int. Cl.[7] ............................................. B60Q 1/26
(52) U.S. Cl. ..................... 340/468; 340/425.5; 340/465; 340/472; 340/475
(58) Field of Search ............................. 340/468, 425.5, 340/431, 463, 464, 465, 472, 475, 479

(56) References Cited

U.S. PATENT DOCUMENTS

| | | |
|---|---|---|
| 2,457,348 A | 12/1948 | Chambers |
| 2,600,751 A | 6/1952 | Gazda |
| 3,601,792 A | 8/1971 | Murray |
| 3,986,022 A | 10/1976 | Hyatt |
| 4,201,451 A | 5/1980 | Jacob |
| 4,450,430 A | 5/1984 | Barishpolsky et al. |
| 4,614,415 A | 9/1986 | Hyatt |
| 4,638,290 A | 1/1987 | Wagner |
| 4,661,800 A | 4/1987 | Yamazaki |
| 4,672,457 A | 6/1987 | Hyatt |
| 4,694,295 A | 9/1987 | Miller et al. |
| 4,922,225 A | 5/1990 | Dankert |
| 4,954,808 A | 9/1990 | Duerkob |
| 5,051,721 A | 9/1991 | Harrison |
| 5,052,792 A | 10/1991 | McDonough |
| 5,059,015 A | 10/1991 | Tran |
| 5,072,210 A | 12/1991 | Kimmelman |
| 5,072,340 A | 12/1991 | Jones |
| 5,090,779 A | 2/1992 | Kramer |
| 5,109,214 A | 4/1992 | Heidman, Jr. |
| 5,212,468 A | 5/1993 | Adell |
| 5,347,261 A | 9/1994 | Adell |
| 5,398,041 A | 3/1995 | Hyatt |
| 5,402,103 A | 3/1995 | Tashiro |
| 5,424,715 A * | 6/1995 | Lietzow et al. ............. 340/539 |

(List continued on next page.)

OTHER PUBLICATIONS

Muth Mirror Systems, Signal Mirror™ Product Survey, 1999, p. 1, Muth Mirror Systems, Sheboygan, Wisconsin.

Muth Mirror Systems, Wide Angle Signal Mirror™ Catalog On–Line Order Center, http://www.kwmuth.com/orders/itm00016.htm, May 11, 2000, p. 1, Muth Mirror Systems, Sheboygan, Wisconsin.

Lighthouse Automotive Inc., Guslights® Advertisement, p. 1, Lighthouse Automotive Inc., La Mirada, California.

*Primary Examiner*—Daryl Pope
(74) *Attorney, Agent, or Firm*—Dalina Law Group P.C.

(57) ABSTRACT

A remote motor vehicle signal indicator system consists of a transmitter coupled to a vehicle indication signal drive line. The transmitter wirelessly transmits a receiver activation signal corresponding to a vehicle indication signal of the vehicle indication signal drive line. The vehicle indication signal is selected from the group consisting of a turn signal, a brake signal, a reverse gear signal, and a hazard signal. The system also includes a remote vehicle signal indicator coupled to a surface outside of the vehicle and includes a signal indicator display. The remote vehicle signal indicator receives the receiver activation signal from the transmitter and, in response, activates the signal indicator display. In some variations, a power supply not coupled to the vehicle power supply powers the remote vehicle signal indicator and the transmitter is powered by the vehicle indication signal.

24 Claims, 9 Drawing Sheets

U.S. PATENT DOCUMENTS

| | | | |
|---|---|---|---|
| 5,428,512 A | 6/1995 | Mouzas | |
| 5,432,526 A | 7/1995 | Hyatt | |
| 5,436,741 A | 7/1995 | Crandall | |
| 5,499,169 A | 3/1996 | Chen | |
| 5,505,493 A | 4/1996 | Camfield et al. | |
| 5,666,103 A * | 9/1997 | Davis, Jr. | 340/479 |
| 5,669,705 A | 9/1997 | Pastrick et al. | |
| 5,680,101 A | 10/1997 | Pitcher | |
| 5,680,123 A | 10/1997 | Lee | |
| 5,684,697 A | 11/1997 | Mullen | |
| 5,774,283 A | 6/1998 | Nagel et al. | |
| 5,793,420 A | 8/1998 | Schmidt | |
| 5,805,366 A | 9/1998 | McFarland | |
| 5,844,479 A | 12/1998 | Walton | |
| 5,863,116 A | 1/1999 | Pastrick et al. | |
| 5,905,434 A | 5/1999 | Steffan et al. | |
| 6,086,229 A | 7/2000 | Pastrick | |
| 6,100,801 A * | 8/2000 | Plummer | 340/479 |
| 6,177,867 B1 * | 1/2001 | Simon et al. | 340/468 |
| 6,406,168 B1 * | 6/2002 | Whiting | 362/473 |
| 6,529,126 B1 * | 3/2003 | Henry | 340/467 |

* cited by examiner

WIRELESS REMOTE VEHICLE SIGNAL INDICATOR FOR SUPPLEMENTING EXISTING VEHICLE SIGNAL INDICATORS

BACKGROUND OF THE INVENTION

1. Field of the Invention

The present invention relates generally to motor vehicle signal indicators, and more specifically to remote motor vehicle signal indicators outside of the motor vehicle. Even more specifically, the present invention relates to remote motor vehicle signal indicators outside of the motor vehicle that are redundant to the existing vehicle signal indicators provided in the vehicle.

2. Discussion of the Related Art

Motor vehicle signal indicators such as brake lamps, turn signal indicators, and reverse indicators are well recognized in the motor vehicle industry as essential elements to motor vehicle safety. These vehicle signal indicators are generally positioned at highly visible locations on the vehicle so that others can easily see them. However, even though these vehicle signal indicators are designed to be easily viewed, a driver driving in a vehicle's "blind spot" may have difficulty seeing the turn signal indicator of the vehicle.

Thus, to increase the visibility of a motor vehicle, and to enhance motor vehicle safety, it is often desirable to supplement an existing motor vehicle's turn signal indicators with additional turn signal indicators. These additional or supplemental turn signal indicators are typically mounted to an exterior surface of a motor vehicle's body in a highly visible area, such as on the side mirrors, for example.

Such supplemental turn signal indicators are often provided "after market" and must be installed by the vehicle owner or other vehicle servicer. Thus, these external supplemental turn signal indicators require wiring to provide both power and the turn signal to the turn signal indicator. Typically, these wires are fed from the source of the turn signal, which is within the vehicle, through the body of the motor vehicle at the point where the external signal indicator is affixed to the vehicle. Disadvantageously, since the supplemental signal indicators are redundant to the existing signal indicators of the vehicle, holes must be provided, e.g., drilled into the motor vehicle's door or body, to allow the power and signal wires from within the vehicle to be coupled to the external signal indicator. Thus, installation is difficult and expensive.

SUMMARY OF THE INVENTION

The present invention advantageously addresses the needs above as well as other needs by providing a remote vehicle signal indicator that may be affixed to areas on a vehicle, e.g., cars, trucks, and trailers, in locations where supplemental signal indicators are desired without having to provide wiring between the remote vehicle signal indicator and the vehicle.

In one embodiment, the invention can be characterized as a remote vehicle signal indicator system for a vehicle including a transmitter coupled to a vehicle indication signal drive line of the vehicle. The transmitter is configured to wirelessly transmit a receiver activation signal corresponding to a vehicle indication signal of the vehicle indication signal drive line. The vehicle indication signal is selected from the group consisting of a turn signal, a brake signal, a reverse gear signal, and a hazard signal. The remote vehicle signal indicator system also includes a remote vehicle signal indicator coupled to a surface outside of the vehicle that includes a signal indicator display. The remote vehicle signal indicator is configured to receive the receiver activation signal from the transmitter and, in response, activate the signal indicator display.

In another embodiment, the invention can be characterized as a remote vehicle signal indicator of a remote vehicle signal indicator system for a vehicle including a housing coupled to a surface outside of the vehicle and a receiver within the housing. The receiver is configured to wirelessly receive receiver activation signals from a transmitter coupled to the vehicle. The receiver activation signals correspond to vehicle indication signals generated by the vehicle. The vehicle indication signals are selected from the group consisting of a turn signal, a brake signal, reverse gear signal and a hazard signal. Additionally, a signal indicator display is coupled to the receiver and configured to display, in response to a received receiver activation signal, a remote vehicle indication signal corresponding to the vehicle indication signals generated by the vehicle.

In a further embodiment, the invention may be characterized as a transmitting device of a remote vehicle signal indicator system for a vehicle including a housing attached to the vehicle and a signal monitoring line coupled to a vehicle indication signal drive line of the vehicle. The signal monitoring line is configured to receive vehicle indication signals from the vehicle indication signal drive line. The vehicle indication signals are selected from the group consisting of a turn signal, a brake signal, reverse gear signal and a hazard signal. The transmitting device also includes a transmitter within the housing and coupled to the signal monitoring line. The transmitter is configured to wirelessly transmit a receiver activation signal corresponding to the vehicle indication signals of the vehicle indication signal drive line to a remote vehicle signal indicator located outside of the vehicle in order to provide additional signal displays to those coupled to the vehicle indication signal drive line.

In yet another embodiment, the invention may be characterized as a method of providing additional vehicle signal indicators for a vehicle, including the steps of: wirelessly receiving a receiver activation signal at a remote vehicle signal indicator coupled to a surface outside of the vehicle wherein the receiver activation signal is transmitted from the vehicle, the receiver activation signal corresponding to a vehicle indication signal generated within the vehicle wherein the vehicle indication signal is selected from the group consisting of a turn signal, a brake signal, a reverse gear signal, and a hazard signal; and displaying, in response to the wirelessly receiving, a remote vehicle indication signal corresponding to the vehicle indication signal generated within the vehicle, in order to provide additional signal displays to those provided within the vehicle.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION

The following description is not to be taken in a limiting sense, but is made merely for the purpose of describing the general principles of the invention. The scope of the invention should be determined with reference to the claims.

Figure 1:
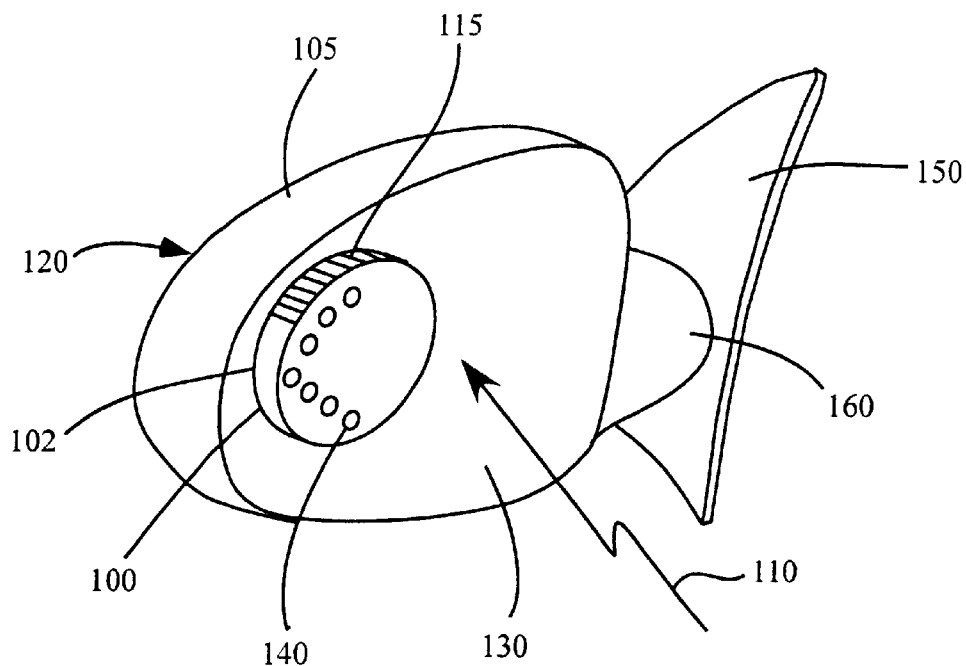
FIG. 1 is a schematic view of a remote vehicle signal indicator in accordance with one embodiment of the present invention.

Referring first to FIG. 1, shown is a schematic view of a remote vehicle signal indicator 100 in accordance with one embodiment of the present invention. Shown are the remote vehicle signal indicator 100, a receiver housing 102, a receiver activation signal 110, a solar panel 115, a side mirror assembly 120, display 140 (also referred to as a vehicle indicator display), a reflective element 130, a casing 105, a neck 160 and a stationary panel 150.

The side mirror assembly 120 (which may be referred to as a side view mirror) includes the casing 105, the reflective element 130, the neck 160, and the stationary panel 150. The casing 105 supports and partially encloses the reflective element 130. The casing 105 is also connected with and supported by the neck 160. The neck 160 is connected with the stationary panel 150, and the stationary panel 150 is connected with the exterior portion of a vehicle which is not shown. The side mirror assembly 120 is typically located along the exterior of a vehicle such as a car or truck, and is typically situated on the vehicle in a location that is visible by both the driver of the car or truck and other vehicles. While the side mirror assembly 120 is shown as a left or driver side mirror assembly for attachment to a left side of the vehicle, it should be understood that the side mirror assembly 120 may be a right side mirror assembly for attachment to the right side of the vehicle.

The remote vehicle signal indicator 100 which includes the display 140, the receiver housing 102, and the solar panel 115 is connected with the exposed face of the reflective surface 130, and the receiver activation signal 110 is transmitted from a location within or on the vehicle and received by the remote vehicle signal indicator 100.

According to several embodiments of the invention, the remote vehicle signal indicator 100 is part of a wireless vehicle signal indicator system including the remote vehicle signal indicator 100 and a wireless signal transmitter (not shown in FIG. 1) located within or on the vehicle and coupled to the vehicle's internal signal indicators. According to one embodiment, the remote vehicle signal indicator 100 and the wireless signal transmitter within the vehicle include a radio frequency (RF) receiver and an RF transmitter, as known in the art. In practice, the remote vehicle signal indicator 100 wirelessly receives the receiver activation signal 110 that is wirelessly transmitted from the transmitter within the vehicle, and in response, provides a supplemental vehicle signal indicator via the display 140 that is similar to the vehicle's existing signal indicators. For example, when an existing left wired turn indicator of the vehicle is activated so that it is flashing on and off, the remote vehicle signal indicator 100 (when programmed to be a left wireless turn signal indicator) provides a supplemental vehicle signal indicator via the display 140 that flashes on and off together with the existing wired turn indicator of the vehicle.

According to several embodiments of the invention, the remote vehicle signal indicator 100 is a self contained wireless signal receiver. In practical terms, this means that the remote vehicle signal indicator 100 is not reliant upon power from the vehicle or signal wires from the vehicle; thus, the remote vehicle signal indicator 100 may be easily attached and positioned by adhesion (e.g., chemical adhesive, mechanical and/or magnetic coupling) upon convenient exterior surfaces of the vehicles without concern for drilling holes or providing other access to the interior of the vehicle to connect with signal and/or power wires. This is because the remote vehicle signal indicator 100 receives the signals to operate (e.g., the receiver activation signal 110) wirelessly from a transmitter within the vehicle. Further, the remote signal indicator 100 includes its own power supply and is not reliant upon power from within the vehicle. In the embodiment illustrated, the solar panel 115 is integrated as part of the remote vehicle signal indicator 100, and provides energy to operate the remote vehicle signal indicator 100 (e.g., to charge a battery within the remote vehicle signal indicator 100). In other embodiments, a battery source is provided within the receiver housing 102 without the use of the solar panel 115.

The display 140, is located on an exposed face of the remote vehicle signal indicator 100, and as shown in FIG. 1, is a series of lamps, e.g., light emitting diodes (LEDs), that illuminate in response to the receiver activation signal 110 being received at the remote vehicle signal indicator 100. As discussed further with reference to FIG. 3, the display 140 may be any light source that is visible to drivers and pedestrians that are in the vicinity of the vehicle, such as incandescent lamps or LEDs. In the embodiment illustrated, the display 140 comprises a series of lamps that are arranged as an arrow representing a turn indicator display. In other embodiments, the signal display may have other arrangements of lamps, optionally with reflectors and lenses, that provide a desired level and/or desired direction of illumination.

The remote vehicle signal indicator 100 as shown may be attached to with the reflective surface 130 of the side mirror assembly 120. Advantageously, the remote vehicle signal indicator 100 may be attached to the reflective surface 130 with an adhesive, such as an epoxy, and need not be affixed with hardware, such as screws, which may damage the reflective element 130 and/or the remote vehicle signal indicator 100. In other embodiments, however, the remote vehicle signal indicator 100 may be attached with hardware where it is either convenient or more desirable to do so.

In other embodiments, the remote vehicle signal indicator 100 may be positioned at other desirable locations on the exterior of the vehicle, or on trailers, e.g., tractor trailers, boat trailers, light duty trailers, etc., that are pulled by the vehicle, or on objects carried by trailers, e.g., boats, cars, bikes, boxes and crates where, for example, the wired turn indicators supplied with the vehicle or trailer by the Original Equipment Manufacturers (OEMs) are inadequate.

In other embodiments, the receiver activation signal 110, and the remote vehicle signal indicator 100 are configured to provide additional vehicle signal indications other than turn signal indications. For example, the receiver activation signal 110 may be indicative of various wired or existing signal indicators on the vehicle including, without limitation, the vehicle's existing brake indicators, reverse gear indicators, and/or hazard signal indicators. Thus, in some embodiments, the remote vehicle signal indicator 100 provides redundant vehicle brake indicators, reverse gear indicators, and/or hazard indicators. In such embodiments, the remote vehicle signal indicator may be positioned at any desired location on the vehicle, e.g., along the side of the vehicle, at the rear of the vehicle, or on a trailer or other object being towed by the vehicle.

Figure 2A:
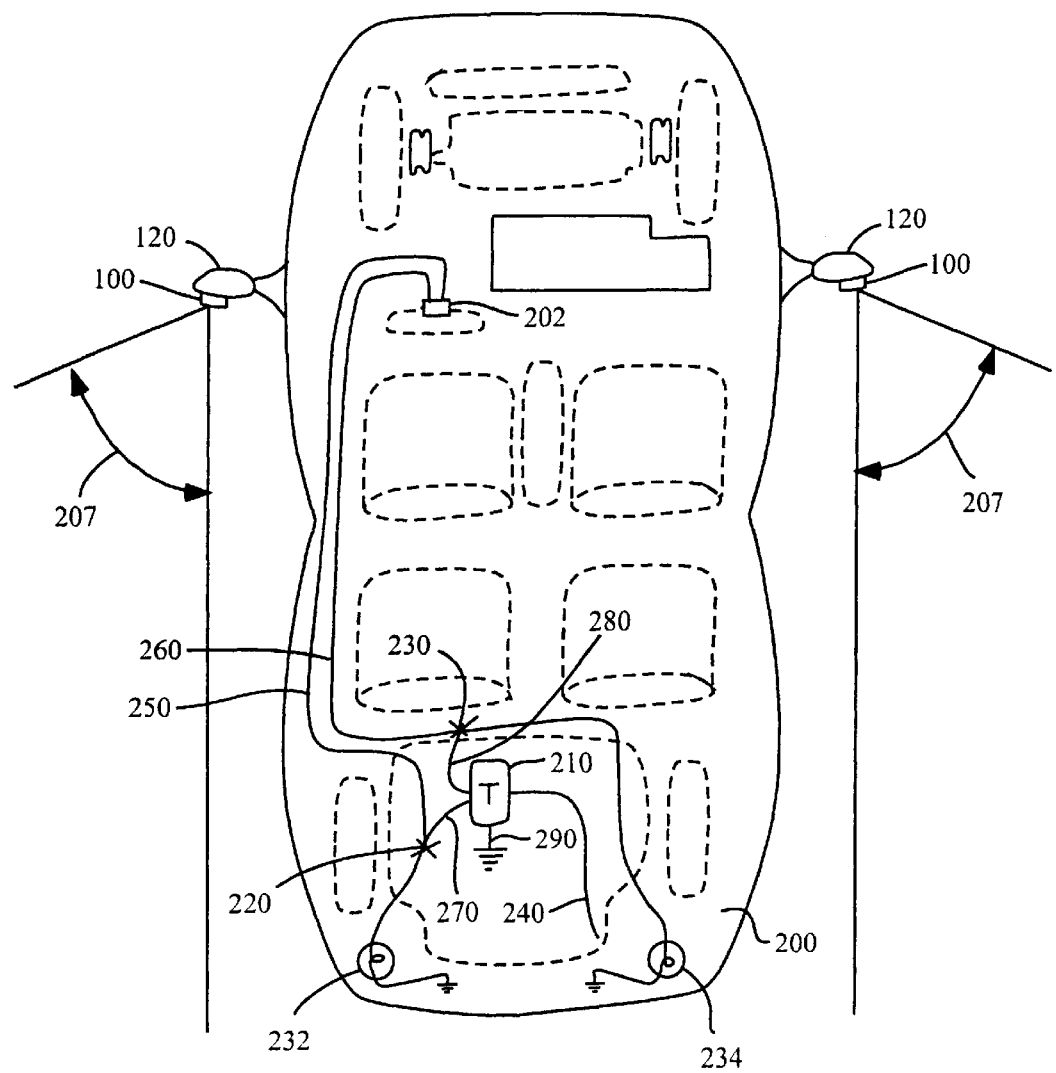
FIG. 2A is a schematic diagram showing an implementation of the remote vehicle signal indicator of FIG. 1 according to one embodiment of the invention.

Referring next to FIG. 2A, shown is a schematic diagram showing one implementation of the remote vehicle signal indicator 100 of FIG. 1. Shown is a vehicle 200, two side mirror assemblies 120, a turn indicator generator 202, a signal light beam spread 207, a transmitter 210, a left wired turn signal indicator 232, a right wired turn signal indicator 234, left signal monitoring line 270, right signal monitoring line 280, left signal line tap 220, right signal line tap 230, remote vehicle signal indicators 100, a left turn signal driveline 250, a right turn signal driveline 260, a transmission antenna 240, and a ground line 290.

The turn signal generator 202, shown in this embodiment in a steering column of the vehicle 200 is coupled with the left signal driveline 250 and the right signal driveline 260. The left signal driveline 250 and the right signal driveline 260, which may be referred to generally as vehicle indication signal drivelines, are each coupled to the left wired turn signal indicator 232 and the right wired turn signal indicator 234, respectively (which may be referred to generally as wired signal indicators). The left signal monitoring line 270 is coupled with the left signal driveline 250 at the left signal line tap 220. The right signal monitoring line 280 is coupled with the right signal driveline 260 at the right signal line tap 230. The transmitter 210, shown in this embodiment in the trunk of the vehicle 200, is coupled to the transmission antenna 240, the left signal monitoring line 270, the right signal monitoring line 280, and the ground line 290 which may be a body ground return wire. The remote vehicle signal indicators 100 are connected with the side mirror assembly 120 located on the left side of the vehicle 200 and the side mirror assembly 120 located on the right side of the vehicle 200.

In operation, when an operator of the vehicle 200 actuates a turn signal lever, the turn signal lever trips a switch within the turn signal generator 202. In response, the turn signal generator 202 generates either, an electrical signal (which may be referred to generically as a "vehicle indication signal") on the left signal driveline 250 when the turn signal lever is actuated in a direction to indicate a left turn, or an electrical signal (which also may be referred to generically as a "vehicle indication signal") on the right signal driveline 260 when the turn signal lever is actuated in a direction to indicate a right turn. In the present embodiment, the right signal driveline 260 and the left signal driveline 250 are wires that carry the vehicle indication signals to the left wired turn signal indicator 232, and the right wired turn signal indicator 234 respectively. The vehicle indication signals that drive the left wired turn signal indicator 232, and the right wired turn signal indicator 234 via the left signal driveline 250 and the right signal driveline 260 respectively are typically a series of electrical energy pulses with sufficient power to illuminate the left wired turn signal indicator 232, and the right wired turn signal indicator 234.

The left signal monitoring line 270 and the right signal monitoring line 280 receive the electrical signals, i.e., the vehicle indication signals, generated by the turn signal generator 202 at the left signal line tap 220 and the right signal line tap 230 respectively, and carry the vehicle indication signals to the transmitter 210. In one embodiment, the left signal line tap 220 and the right signal line tap 230 are commonly available insulation-displacement conductors which allow the left signal monitoring line 270 and the right signal monitoring line 280 to tap into the left signal driveline 250 and the right signal driveline 260 respectively without cutting or disconnecting either the left signal driveline 250 or the right signal driveline 260. Other methods of tapping into the left signal driveline 250 and the right signal driveline 260 as known in the art are contemplated and well within the scope of the present invention.

In response to the received vehicle indication signal, the transmitter 210, as discussed in further detail with reference to FIGS. 6 and 7, produces a receiver activation signal that is broadcast to both remote vehicle signal indicators. For example, the receiver activation signals may be either a left indicator activation signal, in response to a vehicle indication signal from the left signal monitoring line 270, or a right indicator activation signal vehicle indication signal in response to a vehicle indication signal from the right signal monitoring line 280.

As further discussed with reference to FIG. 7, the remote vehicle signal indicators 100 are independently programmable so as to respond only to either right indicator activation signals or left indicator activation signals. Thus, remote vehicle signal indicators 100 placed on a left, or driver side, of the vehicle 200 are programmable to respond to only left indicator activation signals, and remote vehicle signal indicators 100 placed on a right, or passenger side, of the vehicle 200 are programmable to respond to only right indicator activation signals. Both the left and right indicator activation signals broadcast by the transmitter 210 may be referred to generically as receiver activation signals. According to several embodiments, the receiver activation signals provided by the transmitter 210 are encoded to activate only remote vehicle signal indicators 100 on the particular vehicle 200 so that other remote vehicle signal indicators 100 located on other vehicles will not respond to the signal from the transmitter 210. The receiver activation signal is then broadcast wirelessly via the transmission antenna 240. Again, it is noted that the receiver activation signals may correspond to brake, hazard, or reverse gear signals that activate remote vehicle signal indicators 100 that are programmed to receive and respond to such signals.

According to one embodiment of the invention the transmission antenna 240 is displayed as a quarter-wavelength resonant "whip" or "longwire", that may be realized in the form of a 0.05 inch diameter carbon fiber rod for durability, whether within, or outside of, the trunk. To realize higher transmission gains in some embodiments, the transmission antenna 240, and antenna elements of the remote vehicle signal indicators 100 reside in approximately a horizontal plane.

According to one embodiment, a transmission frequency of 315 MHz may be employed utilizing a whip antenna about nine inches in length. At this frequency, many apertures in the automobile body are of the same order of size as the wavelength; further, the rim of the trunk lid, spaced from the body by a rubber weather seal constitutes an effective slot radiator. Even at transmitter power less than 100 milliwatts, it can be empirically demonstrated that at this frequency, RF energy passing through this trunk slot inevitably finds its' way, proceeding from both diffraction and reflection effects of the emitted electromagnetic waves, to antenna elements of the remote vehicle signal indicators 100. Thus, even in an otherwise sealed metallic trunk, the radiant RF energy has effective access to the antenna elements of remote vehicle indicators 100 mounted on the mirror assemblies 120 near the front of the vehicle 200, and effective access to remote signal indicators 100 which may be mounted at the rear of the vehicle 200 or on trailers or other vehicles towed by the vehicle 200. As discussed in more detail with reference to FIG. 6, in other embodiments, the transmission antenna 240 may be a coiled loop antenna or a resonant helix antenna, and other convenient transmission frequencies may be used.

The remote vehicle signal indicators 100, shown on both of the mirror assemblies 120, receive the receiver activation signal and provide an additional or supplemental vehicle indication display that is redundant to the vehicle indication signal (e.g., turn signal, hazard signal, reverse gear signal, brake signal, etc.) of the vehicle 200. In one embodiment, the remote vehicle signal indicators 100 are each programmable to allow the user to match the transmitter 210 to one or more particular remote vehicle signal indicator(s). Additionally, in the one embodiment, each remote vehicle signal indicator 100 is programmable so as to be identifiable as either a left or right turn signal indicator. In other words, in the one embodiment, the user may program each of the remote vehicle signal indicators 100 as a left signal indicator or a right signal indicator, and to respond to receiver activation signals from the transmitter 210, but not similar transmitters located within other vehicles. Once the remote vehicle signal indicator 100 receives a receiver activation signal from a matching transmitter, the remote vehicle signal indicator 100 provides, as previously discussed, an illuminated display that is similar to the display provided by the wired turn signal indicators 232, 234.

While the transmitter 210 and the remote vehicle signal indicators 100 have been described as providing supplemental turn indicator displays, in other embodiments, other types of vehicle displays may be supplemented in much the same way the wired turn signal indicators 232, 234 are supplemented. For example, the remote vehicle signal indicators 100 may be implemented to supplement the vehicle's hazard displays, brake displays, and reverse gear displays. In these additional embodiments, the existing brake lamp, reverse gear lamp and/or hazard lamp driving wires may be tapped in a similar manner as the left signal driveline 250, and the right signal drive line 260 are tapped as discussed above.

Advantageously, in some embodiments, the transmitter 210 utilizes power from the electrical signal, i.e., the vehicle indication signal, transmitted over the left signal driveline 250, and/or the right signal driveline 260 to provide power to the active elements, e.g., circuitry, of the transmitter 210. Thus, the transmitter 210, in some embodiments, is not required to be directly coupled to a vehicle 200 power supply or to include its own power supply. In these embodiments, not only does the transmitter 210 receive the vehicle indication signal, triggering the transmission of a corresponding wireless receiver activation signal to the remote vehicle signal indicator 100, the transmitter 210 also obtains operating power from the same vehicle indication signal. This enables the transmitter 210 to be attached at convenient locations within the vehicle that are not located near the vehicle power; therefore, providing simple, inexpensive installation. In other embodiments where, e.g., remote vehicle signal indicators 100 are utilized to supplement existing brake lamp and reverse lamp displays, electrical signals transmitted over the brake lamp or reverse lamp driving lines may be utilized to power the transmitter 210 as well. In yet other embodiments, the transmitter 210 may not utilize the power of the display signal received from the vehicle's 200 left signal driveline 250, and/or the right signal driveline 260 for power. In such embodiments, the transmitter 210 is coupled to the vehicle's 200 battery power or another power source.

Although the vehicle 200 shown in the present embodiment is a passenger automobile, in other embodiments the vehicle may be a bus, truck, tractor-trailer, boat trailer, towed automobile, etc. Furthermore, the term vehicle as used herein also includes objects, e.g., crates, boxes, bicycles, motorcycles that are carried by vehicles. As such, the remote vehicle signal indicator 100 is suited for use with any means of ground transportation where it is desirable to supplement existing signal indicators, e.g., the wired signal indicators 232, 234.

Figure 2B:
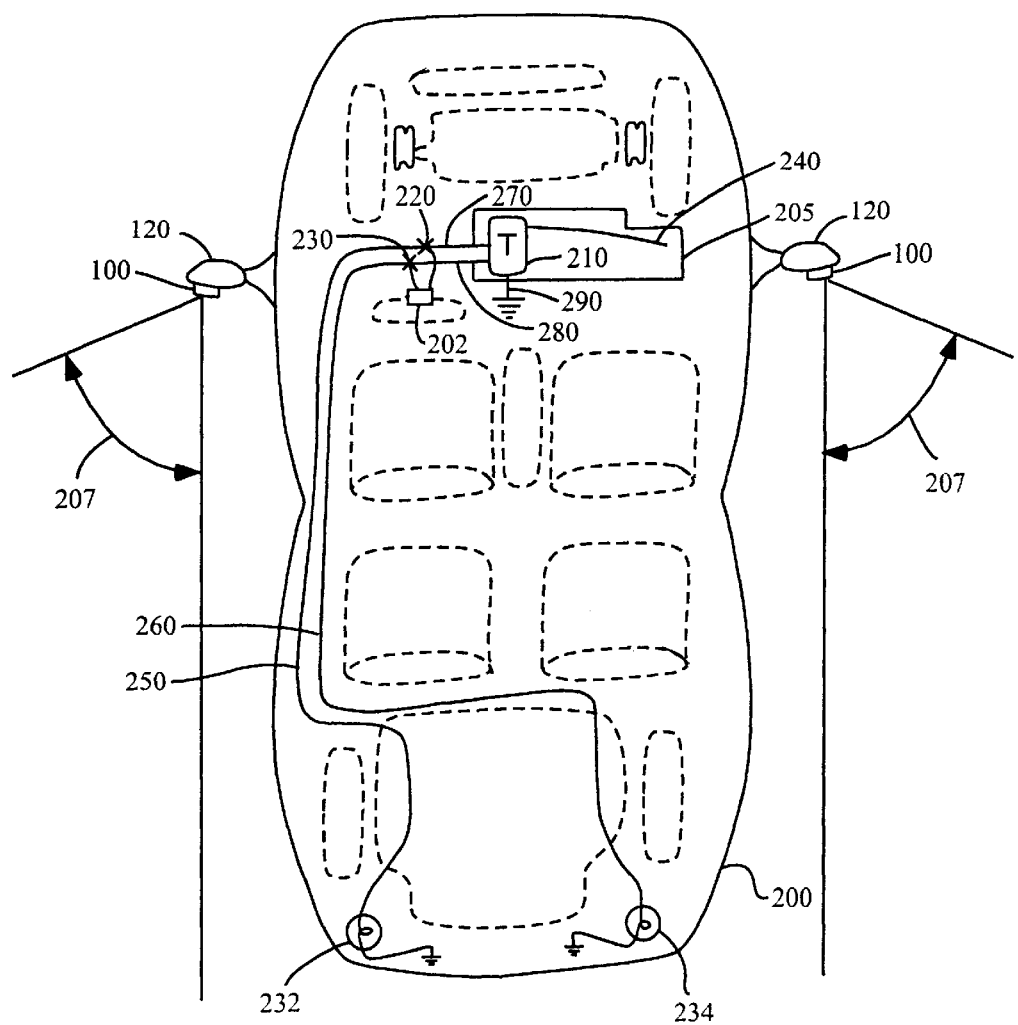
FIG. 2B is a schematic diagram showing another implementation of the remote vehicle signal indicator of FIG. 1 according to another embodiment of the invention.

Referring next to FIG. 2B, shown is a schematic diagram showing another implementation of the remote vehicle signal indicator 100 of FIG. 1 according to another embodiment of the invention. Shown is the vehicle 200, the two side mirror assemblies 120, the turn indicator generator 202, a dashboard 205, the signal light beam spread 207, the transmitter 210, the left wired turn signal indicator 232, the right wired turn signal indicator 234, the left signal monitoring line 270, the right signal monitoring line 280, the left signal line tap 220, the right signal line tap 230, the remote vehicle signal indicators 100, the left turn signal driveline 250, the right turn signal driveline 260, the transmission antenna 240, and the ground line 290.

The turn signal generator 202, shown in this embodiment in a steering column of the vehicle 200 is coupled with the left signal driveline 250 and the right signal driveline 260. The left signal driveline 250 and the right signal driveline 260, which may be referred to generally as vehicle indication signal drivelines, are each coupled to the left wired turn signal indicator 232 and the right wired turn signal indicator 234, respectively (which may be referred to generally as wired signal indicators). The left signal monitoring line 270 is coupled with the left signal driveline 250 at the left signal line tap 220. The right signal monitoring line 280 is coupled with the right signal driveline 260 at the right signal line tap 230. The transmitter 210, shown in this embodiment at the underside of the dashboard 205 of the vehicle 200, is coupled to the transmission antenna 240, the left signal monitoring line 270, the right signal monitoring line 280, and the ground line 290. The remote vehicle signal indicators 100 are connected with the side mirror assembly 120 located on the left side of the vehicle 200 and the side mirror assembly 120 located on the right side of the vehicle 200.

In operation, the present embodiment of the invention functions in the same manner as the embodiment illustrated in FIG. 2A except that the transmitter 210 is located under the dashboard 205 of the vehicle, rather than in the trunk (as illustrated in the embodiment of FIG. 2A). Thus, the transmitter 210 may be located at locations of the vehicle other than the trunk. This alternate location may be helpful in allowing the transmitter to effectively broadcast to the desired remote vehicle signal indicators 100 depending on the structure and resonant features of the vehicle. By coupling the transmitter to alternate locations of the vehicle, the installer may place the transmitter in a location that may provide the best transmission of the signal from the transmitter 210. Furthermore, the installer may choose the location that is easier and less expensive for installation purposes.

Figure 3:
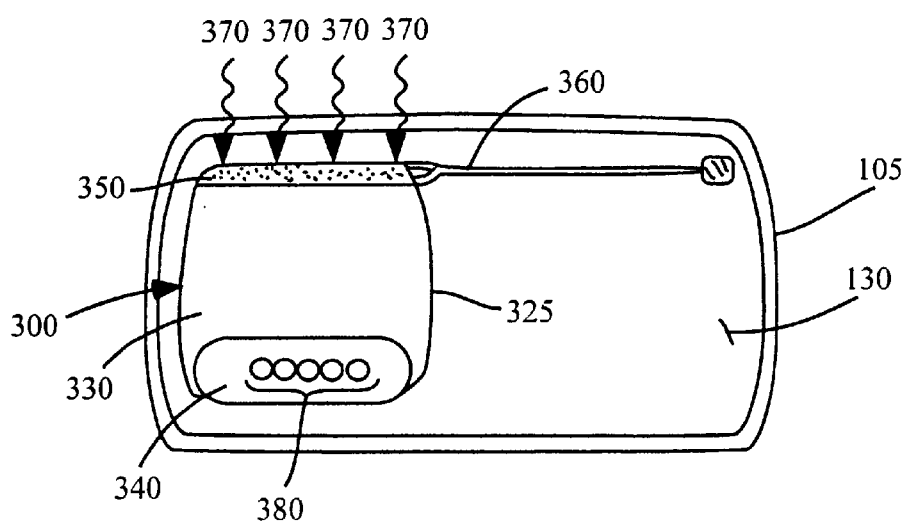
FIG. 3 is a detailed schematic view of one embodiment of the remote vehicle signal indicator of FIG. 1, such as implemented in accordance with one embodiment of the invention.

While the transmitter 210 has been shown in the trunk and the underside of the dashboard of the vehicle, it should be understood that in other embodiments the location of the transmitter 210 is not limited to these locations. For example, without limitation, the transmitter 210 may be located under a hood of the vehicle 200, to the vehicle chassis, on the underside of the vehicle 200 (e.g., in a pickup truck that does not have a trunk or in a truck bed), and on a towing hitch of the vehicle 200. Thus, the transmitter 210 is not required to be located within the vehicle itself. Referring next to FIG. 3, shown is a detailed schematic view of one embodiment a remote vehicle signal indicator 300 as attached to the side mirror assembly of the vehicle 200. Shown are the reflective element 130, the casing 105, a remote vehicle signal indicator enclosure 325, a signal indicator display 380, a display reflector 340, a front surface 330, a solar panel 350, incident solar rays 370, and an antenna element 360.

The remote vehicle signal indicator enclosure 325 is connected with reflective element 130 of the side mirror assembly 120. The remote vehicle signal indicator enclosure 325 surrounds the front surface 330, and houses the solar panel 350. The antenna element 360 is coupled to the enclosure 325. The incident solar rays 370 are shown impinging upon the solar panel 350.

In practice, the remote vehicle signal indicator enclosure 325 may be attached to the surface of the reflective element 130 with an industrial-grade adhesive; thus, allowing the remote vehicle signal indicator 300 to be affixed without drilling holes or otherwise affecting the integrity of the reflective element 130 or the casing 105 or the body of the vehicle. In other embodiments, the remote vehicle signal indicator 300 may be affixed with other securing hardware, e.g., screws. Furthermore, in other embodiments, the remote vehicle signal indicator 300 may be affixed to other locations on the vehicle 200, a trailer pulled by the vehicle 200 or objects carried by the vehicle. To permit easy installation and removal, the remote vehicle signal indicator 300 may be equipped with a magnetic backing; thus, allowing placement of the remote vehicle signal indicator 300 on ferromagnetic surfaces (e.g., iron, cobalt, nickel, and alloys containing these elements) of the vehicle 200, objects carried by the vehicle 200, and/or trailers pulled by the vehicle 200 without chemical adhesive and/or other fasters (e.g., screws).

The front surface 330 may be a convex, mirrored surface that provides a wide angle view of the rearward facing direction when viewed by a driver of the vehicle 200. Such a convex mirrored surface advantageously mitigates any loss in the rearward viewing area, i.e., the area alongside and behind the vehicle 200, when the remote vehicle signal indicator 100 is affixed to the reflective surface 130 of a side view mirror, and may provide a better view of other vehicles within the vehicle's ordinary "blind spot". In other embodiments, the front surface 330 may be substantially flat, and in yet other embodiments, may be non-reflective.

In the present embodiment, the signal indicator display 380 is a collection of one or more light sources, e.g., lamps that provide illumination in a manner similar to the wired signal indicators of the vehicle. For example, the signal indicator display 380 may provide pulses of light synchronous with the vehicle's 200 existing wired turn signal indicators, or, for example, the signal indicator display 380 may provide constant illumination over the same time periods as the vehicle's 200 existing wired brake lamp indicators. In the present embodiment, the signal display, as shown in FIG. 3, is a linear array of light emitting diodes (LEDS) that may be may be high efficiency red LEDS.

The display reflector 340, illustrated in one embodiment as near the bottom of, and within a "cut out" of the front surface 330, provides a reflector, that may be parabolic in shape, designed to collect indirect light emanating from the light sources with the signal indicator display 380 and direct the indirect light away from the front surface 330 so that other pedestrians or vehicles in close proximity with the vehicle 200 may see the a signal light beam spread 207 generated by the signal indicator display 380. The signal indicator display 380 may be positioned behind the focal point of the display reflector 340, and in one embodiment, as is shown in FIG. 3, the horizontal aperture of the display reflector 340 may be larger than the vertical aperture of the display reflector 340. In such an orientation, the display reflector 340 may be designed to provide the signal light beam spread 207 with a horizontal divergence of approximately 60 degrees and a vertical divergence of about 20 degrees. Such beam angles have been found to provide an overall beam spread to make the remote vehicle signal indicator 300 visible from other vehicles that are positioned in typical following or passing locations. Those skilled in the art will appreciate that various display reflector 340 designs may be satisfactorily employed to accommodate varying patterns, e.g., vertical, circular, and arrow shaped patterns, of the signal indicator display 380 while delivering the signal light beam spread 207 in a manner visible to other motorists and pedestrians. It is noted that while five LED's are illustrated in the signal indicator display 380, it should be understood that the number of light sources may be varied so that as few as one or two light sources, e.g., LED light sources, may be used. Additionally, the type of light sources utilized in the signal indicator display 380 may be varied depending upon the particular power available, light sources available, and/or visual effects desired. Further, nothing in this application should be interpreted to exclude the use of lensing materials, whether colored or clear, articulated or flat, to realize desired propagation characteristics for the signal indicator display 380.

Under daylight conditions, the solar panel 350, in the present embodiment, provides electrical power to charge batteries (not shown) that are internal to the remote vehicle signal indicator enclosure 325. The solar panel 350 may be alternatively comprised of polycrystalline or amorphous silicon photocells that convert solar energy into electrical energy. It should be noted that while the solar panel 350 is shown situated atop the remote vehicle signal indicator enclosure 325, it may be designed to wrap around the portions of the remote vehicle signal indicator enclosure 325 that receive solar energy exposure, or alternatively, the solar panel 350, as discussed with reference to FIG. 9, may be located remotely from the signal indicator enclosure 325 on, for example, a top surface of the casing 105, on a roof of the vehicle 200, or on a top of a trailer pulled by the vehicle 200. As further discussed with reference to FIG. 7, the batteries receive energy from the solar panel 350 and store power that is later delivered to the electrical components, e.g., signal receiving elements and display driver elements, within the remote vehicle signal indicator 300. The batteries charged by the solar panel 350 may be any suitable rechargeable battery, e.g., nickel metal-hydride (NiMH) or lithium ion (Li-ion) storage panels, or other batteries of sufficient power and energy to sustain operation of the remote vehicle signal indicator 300 during periods of low light or darkness. In other embodiments, the batteries may be non-rechargeable, disposable batteries that power the electrical components within the remote vehicle signal indicator 300 without being charged or supplemented by the solar panel 350. In yet other embodiments, where, for example, a power source is readily available, the remote vehicle signal indicator 300 may obtain power from a readily available power source, and thus, need not operate under power received from either batteries or the solar panel 350 at all.

Figure 4:
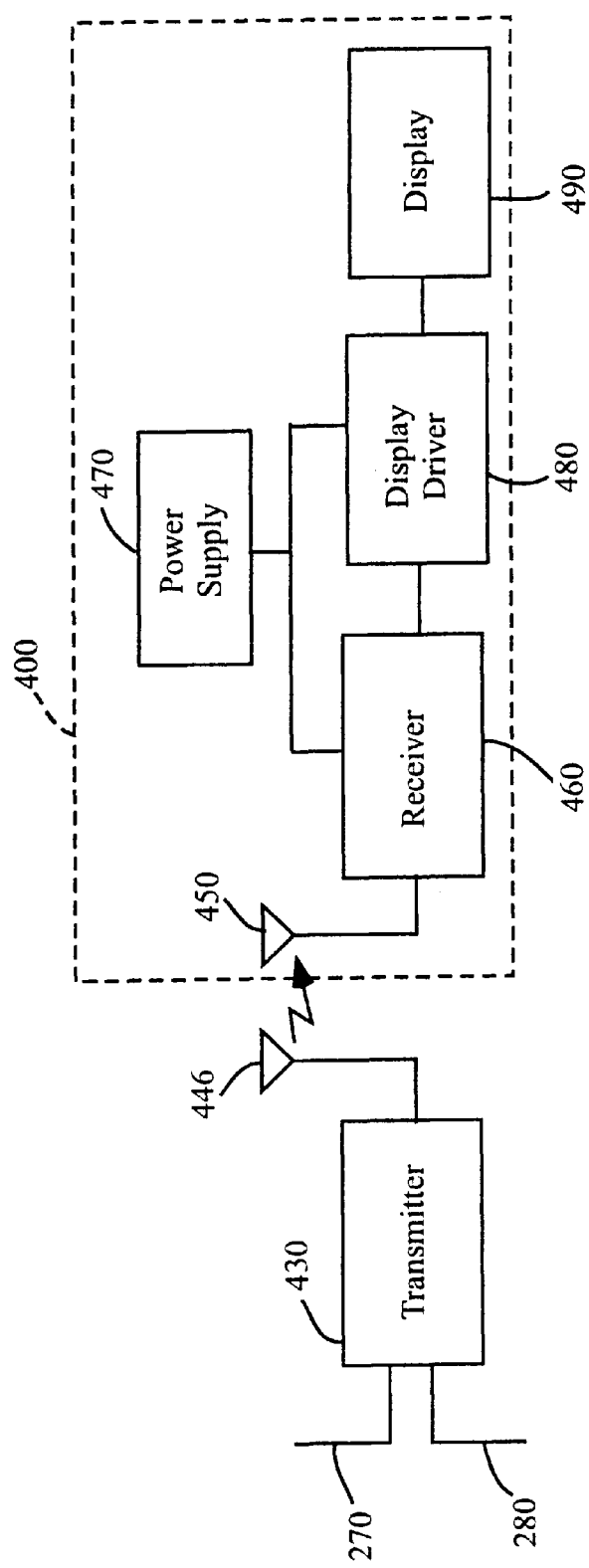
FIG. 4 is a functional block diagram of a wireless remote vehicle signal indicator system according to one embodiment of the invention.

Referring next to FIG. 4, shown is a functional block diagram of a wireless remote vehicle signal indicator system according to one embodiment of the invention.

Figure 5A:
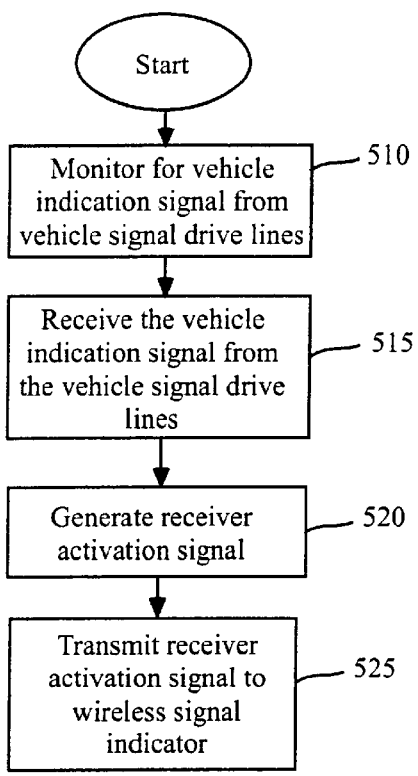
FIG. 5A is a flowchart illustrating the steps for transmitting a wireless vehicle signal indication to a remote vehicle signal indicator according to one embodiment of the invention.

While referring to FIG. 4, concurrent reference will be made to FIG. 5A and FIG. 5B, which are flowcharts illustrating the steps performed, in one embodiment, by a transmitter 430 and a remote vehicle signal indicator 400 in supplementing a vehicle's existing wired signal indicators.

Shown are the transmitter 430, a transmitting antenna 440, the left signal monitoring line 270, and the right signal monitoring line 280. Also shown is the remote vehicle signal indicator 400 that includes a receiving antenna 450, a receiver 460, a display driver 480, a display 490 (which may be referred to as a signal indicator display), and a power supply 470.

The receiving antenna 450 is coupled to the receiver 460, and the receiver 460 is coupled to the power supply 470 and the display driver 480. The display driver 480 is coupled to the display 490 and the power supply 470. The left signal monitoring line 270 and the right signal monitoring line 280 are coupled to the transmitter 430. The transmitter 430 is coupled to the transmitting antenna 440. The transmitting antenna 440 transmits signals wirelessly to the receiving antenna 450.

The transmitter 430, as is discussed in further detail with reference to FIG. 6, monitors the left and right signal drivelines 250, 260, for a vehicle indication signal (Step 510 of FIG. 5A), e.g., an electrical signal that may be a pulsed electrical turn indicator signal, at the left and right signal line tap 220, 230 by monitoring for the vehicle indication signals at the left signal monitoring line 270 and the right signal monitoring line 280.

Figure 6:
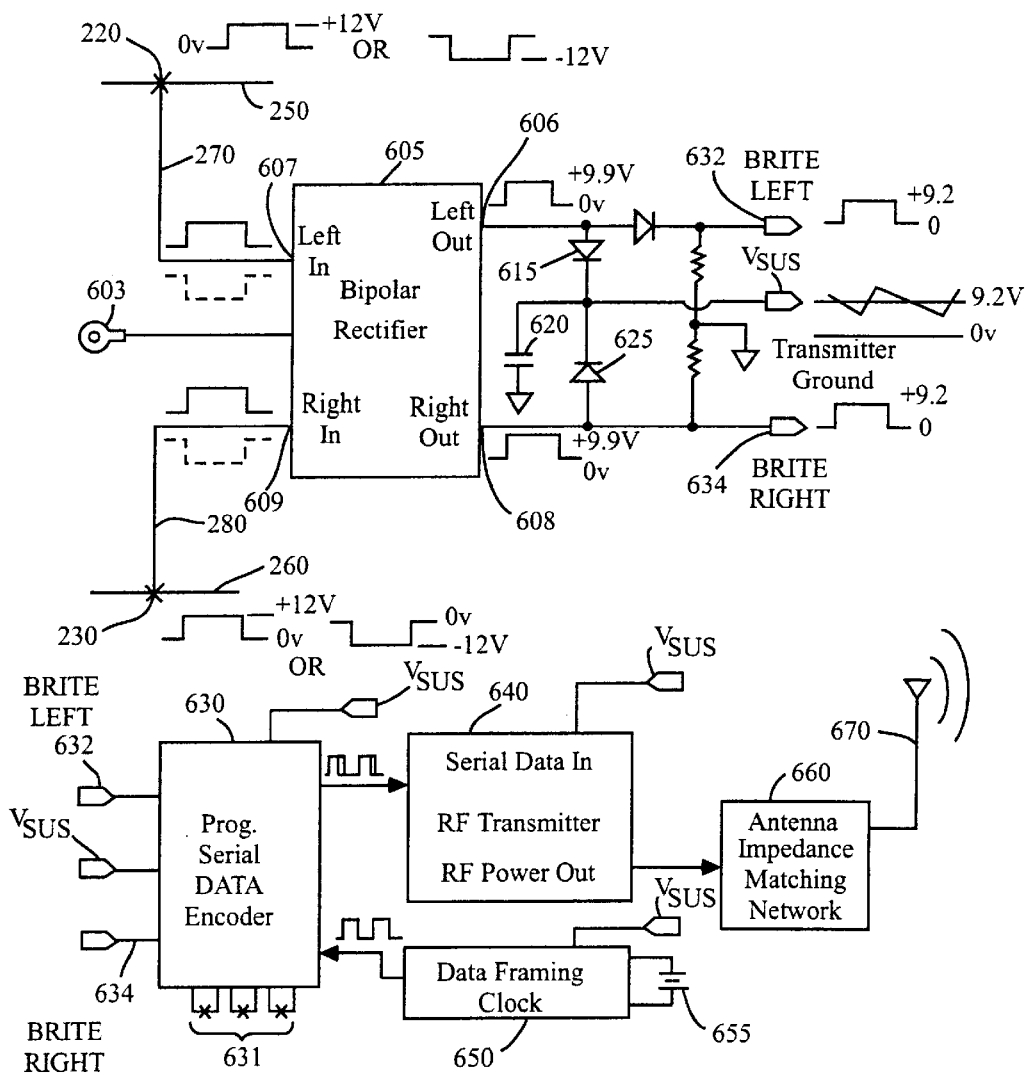
FIG. 6 is a functional block diagram of the transmitter of FIG. 4 according to one embodiment of the invention.

Next, when a vehicle indication signal is on the vehicle signal drivelines 250, 260, the transmitter 430 receives the vehicle indication signal (Step 515 of FIG. 5A), the transmitter 430 receives and processes the vehicle indication signal and generates a receiver activation signal (Step 520 of FIG. 5A), as discussed further in reference to FIG. 6, by modulating a carrier wave in response to the received vehicle indication signal. The receiver activation signal corresponds to the vehicle indication signal that is generated within the vehicle. For example, the receiver activation signal is a pulsed signal that is synchronous with the vehicle indication signal. The transmitter 430 then transmits the receiver activation signal to the remote vehicle signal indicator 400 (Step 525 of FIG. 5A) wirelessly via the transmitting antenna 440.

The receiver 460, as discussed in further detail with reference to FIG. 7, monitors the receiving antenna 450 for the receiver activation signal from the transmitter 430 (Step 530 of FIG. 5B). Next, the receiver activation signal is received (Step 535 of FIG. 5B) at the remote vehicle signal indicator 400, e.g., the receiver 460 receives and demodulates the receiver activation signal to obtain the vehicle indication signal.

The display driver 480 receives the vehicle indication signal and generates a display signal (Step 540 of FIG. 5B) that provides sufficient power at an appropriate voltage to drive, i.e., illuminate, the display 490.

Figure 5B:
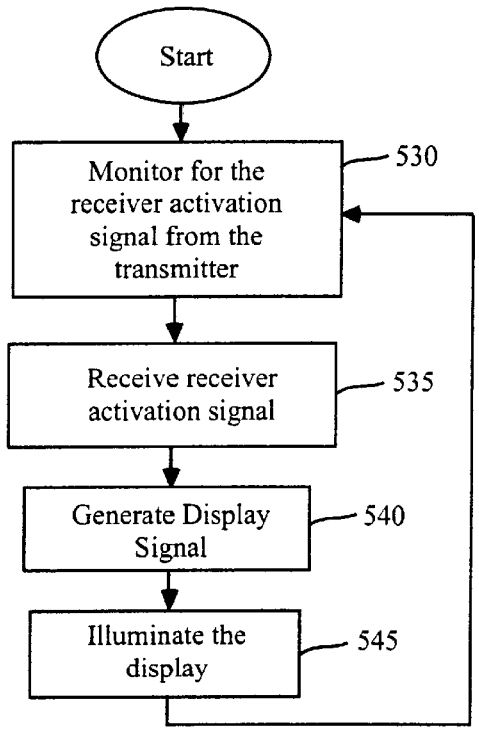
FIG. 5B is a flowchart illustrating the steps for displaying a signal received wirelessly at a remote vehicle signal indicator according to one embodiment of the invention.

The display 490, receives the display signal, and in response, illuminates the display 490 (Step 545 of FIG. 5B). The display signal and the illumination level of the display 490 correspond to the vehicle indication signal which, in the present embodiment, corresponds to either the left or right wired turn indicators of the vehicle 200. For example, if the vehicle indication signal is a turn signal, both the display signal and the illumination level of the display 490 will be pulse-like. Therefore, in this example, the display 490, which may include, for example, the signal indicator display 380, illuminates synchronously with an existing, flashing, wired turn signal indicator 232 or 234 of the vehicle 200. However, in other embodiments, the vehicle indication signal corresponds to other vehicle signal indications, e.g., brake lights, reverse lights, hazard lights, etc., having static durations, or pulse widths and repetition rates as required.

The power supply 470 of the remote vehicle signal indicator 400 provides operational power to both the receiver 460 and the display driver 480. The power supply may utilize a combination of solar energy conversion along with energy storage devices, e.g., batteries, to provide this operational power.

Referring next to FIG. 6, shown is one embodiment of the transmitter 430 of FIG. 4. Shown is the left signal line tap 220, the right signal line tap, 230, the left signal drive line 250, the right signal driveline 260, the left signal monitoring line 270, the right signal monitoring line 280, a body ground padeye 603 (also referred to as a "ground connection"), a bipolar rectifier 605, a left signal input 607, a right signal input 609, a left signal rectifier diode 615, a right signal rectifier diode 625, a storage capacitor 620, a programmable serial encoder 630, serial fusing links 631 (alternatively referred to as serial cutting links 631), a radio frequency (RF) transmitter 640, a data framing clock 650, a crystal 655, an impedance matching network 660, and a transmission antenna 670.

The left signal monitoring line 270 is coupled to the left signal drive line 250 at the left signal line tap 220. The right signal monitoring line 280 is coupled to the right signal drive line 260 at the right signal line tap 230. As discussed above, the left signal monitoring line 270 and the right signal monitoring line 280 receive the electrical signals, i.e., the left and right turn signals (generically known as the vehicle indication signals), generated in the operation of the vehicle 200. The left signal monitoring line 270 and the right signal monitoring line 280 carry the vehicle indication signals to the left input 607 and the right input 609 of the bipolar rectifier 605 respectively. The body ground padeye 603, also connected with the bipolar rectifier 605, in the present embodiment, allows the bipolar rectifier 605 to be grounded by attachment of the body ground padeye 603 to the body of the vehicle at any convenient point close to the transmitter 430.

Beneficially, the bipolar rectifier 605, for example, a diode bridge rectifier, provides accommodation for positive or negative body grounding schemes in host vehicles. In most vehicles, the wired turn signal lamps 232, 234 are activated by switching the positive polarity on and off with a fixed return provided by local grounding of the signal lamps to the vehicle body. In some vehicles, however, the vehicle body is positively grounded, and the grounded polarity is switched on and off. The bipolar rectifier 605 allows for installation without concern for the grounding scheme of the host vehicle by providing an output to the left signal rectifier diode 615 and the right signal rectifier diode 625 wherein the positive polarity is switched on and off regardless of the host vehicle's grounding scheme; thus, installation is simplified because an installer need not be concerned with the polarity of the host vehicle's body.

A less common circuit scheme for wired signal displays, e.g., turn signal lamps, brake lamps, reverse gear lamps and hazard lamps that are integral with the vehicle 200, brings the vehicle's 12 volt supply to each lamp without switching, and illuminates the wired signal displays by completing their return paths to body ground. When such a circuit scheme is encountered, the left signal monitoring line 270 and the right signal monitoring line 280 are connected with line taps to the left and right wired display lamps' switched ground return cables, respectively (not shown). In this embodiment, the body ground padeye 603 is electrically coupled to an unswitched 12 volt cable with an insulation displacement tap.

In the present embodiment, the bipolar rectifier 605 has a left signal output 606 and a right signal output 608 that are electrically coupled to the left signal rectifier diode 615 and the right signal rectifier diode 625, respectively. The bipolar rectifier 605 provides, via the left signal output 606 or the right signal output 608, positive signal pulses regardless of the type of grounding scheme a body of the host vehicle has.

Beneficially, power to operate the programmable serial encoder 630, the RF transmitter 640, and the data framing clock 650 may be derived from either the left or right signal pulses from the left signal output 606 or the right signal output 608, respectively. Energy from the left signal pulses and the right signal pulses is passed by the left signal rectifier diode 615 and the right signal rectifier diode 625 respectively into the storage capacitor 620. The storage capacitor 620 functions to maintain an acceptable level of power to the programmable serial encoder 630, the RF transmitter 640, and the data framing clock 650 by storing energy received from either the left or the right signal pulses and providing power in between the received left or right signal pulses to the programmable serial encoder 630, the RF transmitter 640, and the data framing clock 650. In one embodiment, the storage capacitor 620 is approximately 2200 microfarads so that it produces a sustaining voltage with a nominal average value of 9.2 volts, and a ripple magnitude that is determined by the pulse repetition rate. The sustaining voltage, (illustrated as $V_{SUS}$ in FIG. 6), is provided to the programmable serial encoder 630, the RF transmitter 640, and the data framing clock 650. Thus, the transmitter 430, in the present embodiment, receives operating power from either of the signal monitoring lines 270, 280. Those of ordinary skill in the art will recognize that the capacitor size and precise circuitry may be varied to deal with varying energy levels received by signal pulses and to meet the particular power demands of the hardware utilized for the programmable serial encoder 630, the RF transmitter 640, and the data framing clock 650.

The ability of the transmitter 430 to receive power from either the left or right signal driveline 250, 260, via the left signal monitoring line 270 or the right signal monitoring line 280, respectively, allows the transmitter 430 to be installed without having to locate power lines within the vehicle to operate the transmitter 430. Thus, installation is simplified and less expensive because labor otherwise required to feed wires from a power source within a vehicle to the transmitter 430 is avoided, and additional parts needed, e.g., wires and connectors, to do so are unnecessary.

The left and right signals provided by the bipolar rectifier 605 are also supplied to a left signal input 632 (illustrated as BRITE LEFT in FIG. 6) and a right signal input 634 (illustrated as BRITE RIGHT in FIG. 6) of the programmable serial data encoder 630. In the present embodiment, the programmable serial data encoder 630 pulse modulates the RF transmitter 640 at a radio frequency of 315 MHz, but it should be recognized that the programmable serial data encoder 630 may pulse modulate the RF transmitter 640 at other frequencies. Generally frequencies within the range of about 88 megahertz to about 4 gigahertz are technically feasible for pulse modulating the RF transmitter 640, however, many intervening bands across this frequency range will be unsuitable due to domestic and foreign regulatory assignments and restrictions.

In order to encode the signal to be transmitted, so that only desired receivers can use the signal, the programmable serial data encoder 630, in the present embodiment, employs a serial protocol consisting of a signal recognition preamble of various bits, followed by a data stream of 10 bits, and a stop suffix of various bits. The first 8 bits of this data stream uniquely identify the transmitter 430 with one of 256 possible addresses that also identifies the desired receiver in the same vehicle. The ninth and tenth bits indicate whether the transmitted signal is a left or right turn signal. It is recognized that the transmitter 430, in other embodiments, may use any known method of encoding the signal for identification purposes including those methods for error detection and error correction.

The data recognition stream may be inexpensively developed from a number of serial fusing links 631 (e.g., ten serial fusing links 631) coupled with the programmable serial data encoder 630 and located on a PC board (not shown) supporting the programmable serial data encoder 630. As is known to one of ordinary skill in the art, the serial fusing links 631 may each be opened or closed (i.e., fused), and any binary pattern of open and closed fused links may be created. As discussed further herein with reference to FIG. 7, a pattern of open and closed fuse links within the serial fusing links 631 is established, i.e., a user selectable code is established, and a matching pattern of open and closed fuse links is similarly established on a decoder of the receiver. In this way, a particular transmitter may be programmed by selecting a pattern of open and closed serial fusing links 631 that match the pattern of open and closed fuse links of a particular receiver so that the particular transmitter may communicate only with that particular receiver.

The data framing clock 650, coupled to the programmable serial encoder 630, provides inherently accurate framing for the programmable serial encoder 630. In the present embodiment, the data framing clock 650 is an oscillator that employs the crystal 655 which may be an inexpensive crystal (like those used in watches) that oscillates at 32.760 MHz to establish a framing time interval at 30.518 microseconds.

The RF transmitter 640 is coupled to the transmission antenna 670 via the impedance matching network 660. In the present embodiment, the signal (e.g., the receiver activation signal that corresponds to a vehicle indication signal of the vehicle indication signal drive line), in the form of a pulse modulated signal, is carried via the impedance matching network to the antenna 670 and radiated by the antenna 670 into surrounding space to be received by the remote vehicle signal indicator 400. In the present embodiment, the impedance matching network is a passive impedance matching network that facilitates more efficient transfer of the transmitter's output energy into the antenna and surrounding space.

In several embodiments, as discussed with reference to FIG. 2, the antenna 670 is a straight line quarter wavelength "whip" or "longwire" antenna that may be a quarter-wave resonant trace on a transmitter board with an overall length of 8.9 inches. In yet other embodiments, the antenna 670 is a coiled loop antenna having a complex impedance matched to the complex impedance of the RF transmitter 640. Preferably, the coiled loop antenna is fabricated as an etched trace on a printed circuit board, however, this fabrication technique is certainly not required and other fabrication techniques commonly known to one of ordinary skill in the art are not precluded.

In still other embodiments, the antenna 670 may be integrated as a resonant helix in an oscillator tank circuit of the RF transmitter 640. Methods of integrating these helix antennae into transmitter circuits are commonly known to one of ordinary skill in the art.

Although particular antenna designs are disclosed, other designs are contemplated and well within the scope of the present invention.

Figure 7:
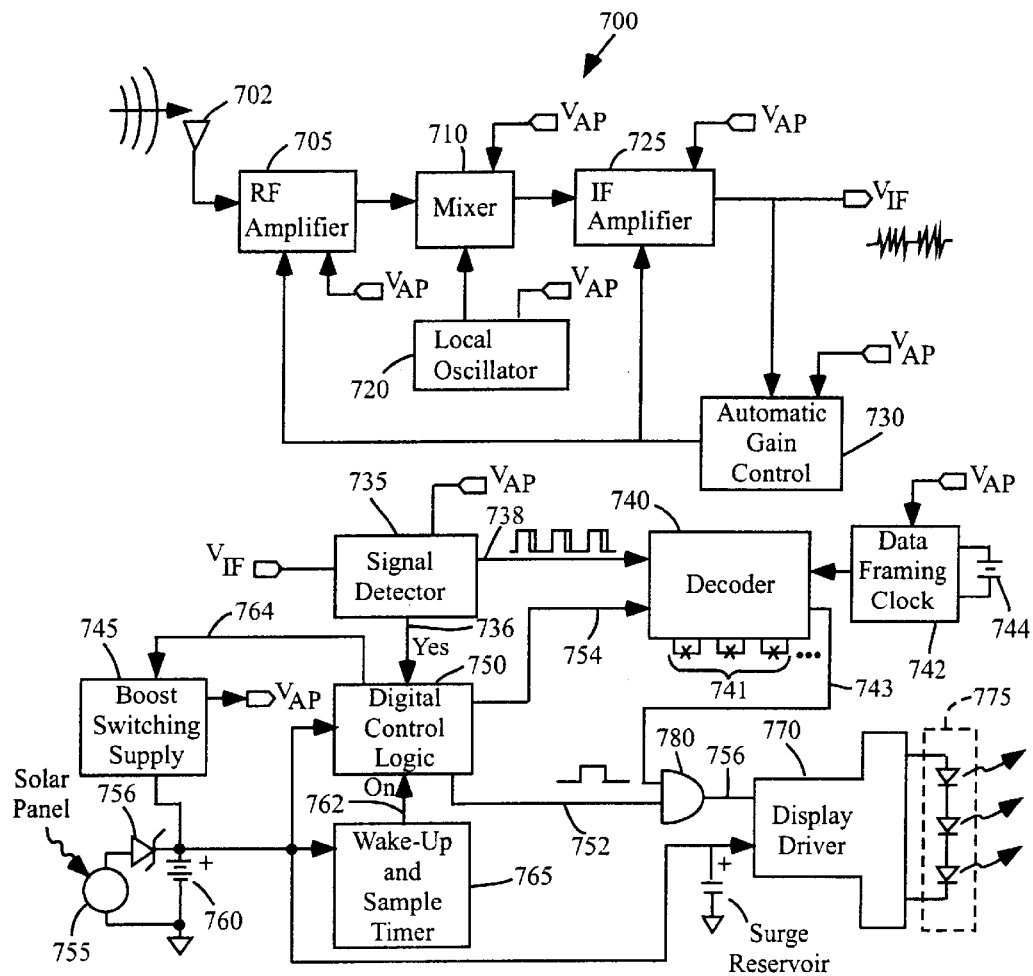
FIG. 7 is a functional block diagram of the receiver, power supply, display driver, and display of the remote vehicle signal indicator of FIG. 4 according to another embodiment of the invention.

Referring next to FIG. 7, shown is a functional block diagram of the functional subcomponents of one embodiment of the receiver 460, the power supply 470, the display driver 480, and the display 490 of FIG. 4. Shown is a receiving antenna 702, a radio frequency (RF) amplifier 705, a mixer 710, a local oscillator 720, an intermediate frequency (IF) amplifier 725, an automatic gain controller 730 (also referred to as AGC 730), a signal detector 735, a decoder 740, fusing links 741 (alternatively referred to as cuttable links 741), a data framing clock 742, a decoding oscillator 744, a boost switching supply 745, a digital control logic module 750, a solar panel 755, a battery 760, a wake up and sample timer 765, a display driver 770, a signal indicator display 775, and an AND gate 780.

In operation, the receiving antenna 702 receives the receiver activation signal in the form of a modulated carrier wave, which may be a pulse modulated signal, transmitted from the transmitter 430. In several embodiments, the receiving antenna 702 is a straight line quarter wavelength "whip" or "longwire" antenna. In yet other embodiments, the antenna 702 is a coiled loop antenna having a complex impedance matched to the complex impedance of an input to the RF amplifier 705. Preferably, the coiled loop antenna is fabricated as an etched trace on a printed circuit board, however, this fabrication technique is certainly not required and other fabrication techniques commonly known to one of ordinary skill in the art are not precluded. In still other embodiments, the receiving antenna 702 may be integrated as a helix in the RF amplifier 705. Methods of integrating these helix antennae into receiver circuits are commonly known to one of ordinary skill in the art.

The receiving antenna 702 is coupled to the RF amplifier 705. The RF amplifier 705 is coupled to the local oscillator 720 and the IF amplifier 725 at the mixer 710. An output of the IF amplifier 725 is coupled to an input of the AGC 730 and a signal detector 735, and an output of the AGC is coupled to the IF amplifier 725 and the RF amplifier 705.

In one embodiment, the receiver 460 of FIG. 4 includes the RF amplifier 705, the mixer 710, the IF amplifier 725, the local oscillator 720, the AGC 730, the signal detector 735, the decoder 740, the data framing clock 742, the digital control logic 750, and the wake up and sample timer 765. The RF amplifier 705, mixer 710, local oscillator 720 and IF amplifier are components of a typical integrated superheterodyne receiver which is well known to one of ordinary skill in the art.

In operation, the receiving antenna 702 provides the receiver activation signal in the form of a modulated carrier wave to the RF amplifier 705 where the receiver activation signal is amplified by the RF amplifier 705 and then mixed at the mixer 710 with a signal from the local oscillator 720 to produce a signal at an intermediate frequency that is fed into the IF amplifier 725 for amplification.

The AGC 730 accepts the output of the IF amplifier and applies a variable DC gain control voltage to the RF amplifier 705 and the IF amplifier 725 so that a stable signal is provided by the IF amplifier 725 to an input of the signal detector 735. This signal is illustrated as $V_{IF}$ in FIG. 7.

The signal detector 735 receives the stable signal ($V_{IF}$) from the IF amplifier 725 and produces a signal in the form of a streaming digital output 738, with zeros denoted by long pulses, and ones denoted by shorter pulses. This streaming digital output 738 is provided to the signal decoder 740. The signal detector 735 in the present embodiment incorporates "preamble" decoding logic to recognize and synchronize the incoming data to the programmable serial data encoder 630 in the transmitter. As discussed with reference to FIG. 6, an 10-bit serial data stream uniquely identifies the transmitter and the direction turn signal.

The streaming digital output 738 of the signal detector 735 is received by the decoder 740 as a signal in the form of a streaming digital input. The data framing clock 742 in the present embodiment is identical to the data framing clock 650 in the transmitter, and provides an accurate frame time that may be 30.518 microseconds for the streaming digital input. In the present embodiment, the decoder 740 compares the streaming digital input to a sequential pattern which may be defined by a number of thin, fusing links 741, e.g., ten fusing links 741. As discussed with reference to FIG. 6, the pattern of fusing links 741 on the decoder 740 is made to be the same as the pattern of fusing or cuttable links on the programmable serial data encoder 630. When an incoming pattern of the streaming digital input matches the sequential pattern defined by the fusing links 741, the decoder 740 provides an enable signal 743 to the display driver 770. The enable signal 743 places the signal indicator display 775 in a state of readiness without illuminating the display by forming one input of the two input AND gate 780 so that the display driver 770 may drive the signal indicator display 775 when a signal 752 is received by the other input to the AND gate 780.

To minimize receiver power consumption at the remote vehicle signal indicator 400 when monitoring for a receiver activation signal, e.g., a turn signal, brake, hazard or reverse gear indicator signals, the wake up and sample timer 765, coupled with the digital control logic 750 and the battery 760, cycles the electrical components of the receiver on and off, as discussed further herein, to reduce the power consumption of the remote vehicle signal indicator 700.

The wake up and sample timer 765, which may be a low power CMOS wake and sample timer, runs continuously from power supplied by the battery 760, and controls the boost switching supply 745 via control logic 750 which, in this embodiment, sends a "wakeup" signal 762 to the digital control logic 750 every 1.9 seconds, and the digital control logic 750, in response to the wakeup signal 762, activates the boost switching supply 745 by sending a boost signal 764 to the boost switching supply.

In one embodiment, the power supply 470 of FIG. 4 is comprised of the boost switching supply 745, the solar panel 755, a Schottky rectifier diode 756, and the battery 760. The battery 760 in one embodiment is a 2.4 volt rechargeable battery which may be two nickel-metal-hydride panels configured in series at 1.2 volts each to provide a total of 2.4 volts.

The boost switching supply 745 increases a voltage from the battery which may be 2.4 volts to a voltage awake power (illustrated as $V_{AP}$ in FIG. 7) that may be about 8 volts. The $V_{AP}$ is supplied to cycled receiver elements that, in the present embodiment, include the RF amplifier 705, the mixer 710, the IF amplifier 725, the local oscillator 720, the AGC 730, the signal detector 735, and the decoder 740. The $V_{AP}$, in this embodiment, is applied to these elements for a period of 100 milliseconds to allow sufficient time for transient settling in the receiver, and an appropriate "listening", i.e., monitoring interval, to determine if a receiver activation signal is entering the antenna 702. Thus, in this embodiment, the boost switching supply 745 is providing continuous power to the cycled receiver elements indicated above for 100 milliseconds in a two-second time period.

If there is no receiver activation signal received during the 100 millisecond "awake interval", the wake up and sample timer 765 removes the wake up signal 762 from the digital control logic 750, and in response, the digital control logic 750 removes the boost signal 764 from the boost switching supply 745; thus, deactivating the boost switching supply 745, and removing the $V_{AP}$ from the cycled receiver elements. As a result, during any two-second interval when no receiver activation signal is received, the $V_{AP}$ voltage is applied to the cycled receiver elements discussed above for only 100 milliseconds. In other words, when no receiver activation signal is detected, power is applied to the receiver elements only five percent of the time; thus, economizing the use of stored energy in the battery 760. This economical use of the stored energy in the battery is important so that the stored energy is consumed at a rate low enough to provide power to the receiver elements through periods when solar exposure is low or almost non-existent, e.g., at night. Under such low solar energy conditions, the battery 760 may not be recharged with energy from the solar panel 755 at a rate at which energy is used by the receiver elements; thus, this economical use of stored energy during monitoring for the receiver activation signal helps to maximize the time the remote vehicle signal indicator 400 is operable before the stored energy is exhausted.

When a vehicle activation signal is received during the 100 millisecond awake interval, the signal detector 735 outputs an affirmative signal 736 (that corresponds to the vehicle indication signal on the signal drive line(s) 250, 260) to the digital control logic 750. In response to the affirmative signal 736, the digital control logic 750 sets an internal flag and keeps the boost switching supply 745 functioning by providing the boost signal 764 to the boost switching power supply 745 for about 30 seconds; thus, over-riding the wake-up and sample timer 765 for that period of about 30 seconds. As a result, $V_{AP}$ is applied to the cycled receiver elements for about 30 seconds to anticipate the next signal.

During the period of about 30 seconds when $V_{AP}$ is applied to the cycled receiver elements, in one embodiment, the digital control logic 750, in response to the affirmative signal 736, provides a signal 752, e.g., in the form of one or more pulse(s), to the display driver 770. In one embodiment, the signal 752 is a pulsed signal having a pulse width approximately equal to the pulse width of the vehicle indication signal on the signal drive line(s) 250, 260 generated within the vehicle 200.

The signal 752 provided by the digital control logic 750 is received by the AND gate 780 and is logically ANDED, with the enable signal 743 received from the decoder 740 so that when both the enable signal 743 is received from the decoder 740 and the signal 752 is received from the digital control logic 750, a remote vehicle indication signal 756, generally referred to as a display signal, is generated that corresponds to (i.e., has a frequency similar to) the vehicle indication signal on the signal drive line(s) 250, 260 generated within the vehicle 200. The remote vehicle indication signal 756 drives the signal indicator display 775 so that the signal indicator display 775 illuminates synchronously with the wired signal indicators (vehicle indication signals) generated within the vehicle 200. Thus, an illuminated display, in response to a receiver activation signal, is provided by the remote vehicle signal indicator 700 that emulates an existing wired signal display.

Beneficially, the remote vehicle signal indicator 700 may be constructed so as to generate sufficient power to be isolated from power sources within the vehicle. In one embodiment, one terminal of the solar panel 755, as shown in FIG. 7, is connected to the positive terminal of the battery 760 through a Schottky rectifier diode 756. The other terminal of the solar panel 755 is connected to the negative terminal of the battery 755.

In one embodiment, the solar panel 755 is an amorphous silicon solar panel with an effective collection area of 3.6 square inches and a typical minimum output in bright, direct sunlight of 20 milliamps at four volts. The solar panel 755 in one embodiment continuously and variably trickle-charges the battery 755 which is composed of two pre-charged nickel-metal-hydride cells in series at 1.2 volts each; thereby making the battery 2.4 volts. In another embodiment, the battery 755 is a lead/acid gel cell, which is more tolerant of trickle charging than most newer battery chemistries.

The Schottky rectifier diode 756 prevents battery discharge through the solar panel 755 during low light conditions. In the nickel-metal-hydride embodiment, a constant current charging circuit is not required because the cells are trickle charged at currents below the ratio of (C/20) amps, wherein C is the battery capacity in milliamp-hours and 20 is a number of hours.

Thus, in several embodiments, the remote vehicle signal indicator 700 is able to operate from power generated by the solar panel 756 without supplemental power from other power sources. As a result, the remote vehicle signal indicator 700 may be located upon a vehicle without concern for the proximity of power sources resident within the vehicle.

Figure 8A:
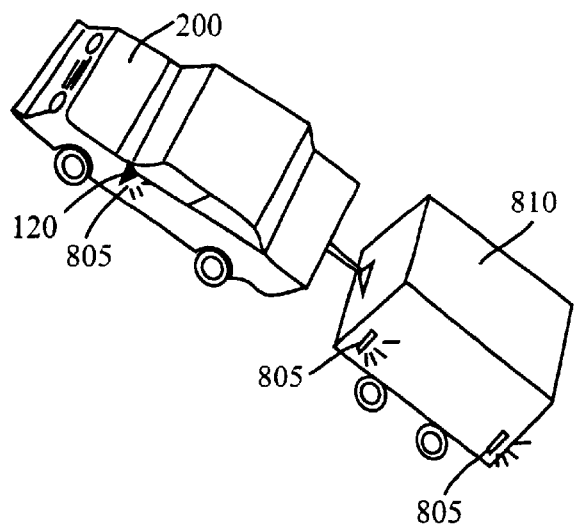
FIG. 8A is a view of an alternative embodiment of the invention wherein remote vehicle signal indicators are affixed to a rear view mirror and affixed to a trailer to supplement existing turn indicator lamps.
Figure 8B:
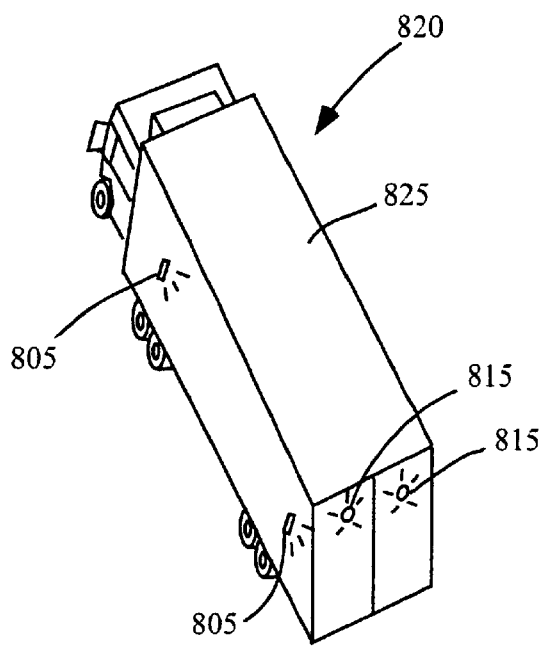
FIG. 8B is a view of an another alternative embodiment of the present invention wherein remote vehicle signal indicators are affixed to an oversized trailer, such as a truck, and are used to supplement the oversized trailer's existing brake lamps and turn indicator lamps.

Referring next to FIG. 8A and FIG. 8B, shown are alternative embodiments of the present invention. Shown in FIG. 8A is the vehicle 200, a trailer 810 and wireless left turn signal indicators 805 (referred to generally as remote vehicle signal indicators). Shown in FIG. 8B is a tractor-trailer 820 having an oversized trailer 825, wireless left turn signal indicators 805, and wireless brake signal indicators 815 (referred to generally as remote vehicle signal indicators).

Referring to FIG. 8A, the vehicle 200 includes a side view mirror assembly 120, and the side view mirror assembly 120 has one of the wireless left turn signal indicators 805 attached to its reflective surface 130. The vehicle 200 is further coupled to a trailer 810 which has two wireless left turn signal indicators 805 affixed to a left exterior face of the trailer 810.

In practice, when the wireless left turn signal indicators 805 receive a receiver activation signal that corresponds to a left turn signal, the wireless left turn signal indicator affixed to the side view mirror assembly 120, as well as the two wireless left turn signal indicators 805 affixed to the trailer, respond with an illuminated display that corresponds to the wired left turn indicators of the vehicle 200. Thus, supplemental turn signal coverage is provided so that when, for example, other motorists are approaching from the rear of the vehicle, but are approximately even with the trailer 810, the wireless left turn signal indicators 805 on the trailer provide additional stimulus to the approaching motorist which may be very beneficial when the view of the vehicle's existing wired indicators are obstructed by the trailer itself and the driver of the vehicle is initiating a left turn. Although the left side of the vehicle 200 and the left side of the trailer 810 are shown, it should be understood that the right side of the vehicle and the trailer may be equipped in the same manner with wireless right turn signal indicators (not shown) that respond in the same manner to a receiver activation signal that is representative of a right turn signal.

Beneficially, the wireless left turn signal indicators 805 need not be fed with wires from within the vehicle 200 to receive either power or the vehicle activation signal. Thus, a vehicle that is not equipped with a signal driveline coupling assembly located near its hitch may have the wireless left turn signal indicators 805 and wireless right turn signal indicators (not shown) added without having to feed wires from the body of the vehicle 200 to the trailer 810, making installation simple and inexpensive.

Referring next to FIG. 8B, connected with the left external face of the oversized trailer 825 are two wireless left turn signal indicators 805, and connected with the rear external face of the oversized trailer 825 are two wireless brake signal indicators 815.

In practice, the wireless left turn signal indicators 805 operate in the same manner in response to a receiver activation signal corresponding to a left turn signal as do the wireless left turn signal indicators 805 discussed in reference to FIG. 8A. The two wireless brake signal indicators 815, however, are responsive to a vehicle activation signal that corresponds to a wired brake signal indicator of the tractor trailer 820. Thus, when a driver of the tractor-trailer 820 equipped with one or more transmitter(s), such as the transmitters 205, 210 of FIG. 2, applies the brakes, a receiver activation signal is transmitted by transmitters within the tractor trailer 820 and received by the wireless brake signal indicators 815 that supplement the existing wired brake lamps of the tractor trailer 820. In response, the wireless brake signal indicators 815 respond with a steady illuminated display for approximately the same period of time as the brakes are applied.

Again, the wireless left turn signal indicators 805 and the wireless brake signal indicators 815 provide supplemental notification to other drivers and pedestrians of impending turning and immediate braking that might otherwise go unnoticed.

It should be recognized that supplemental wireless hazard signal indicators and/or reverse gear signal indicators may be implemented in much the same manner as shown with the left turn signal indicators 805 and the brake signal indicators 815.

Figure 9:
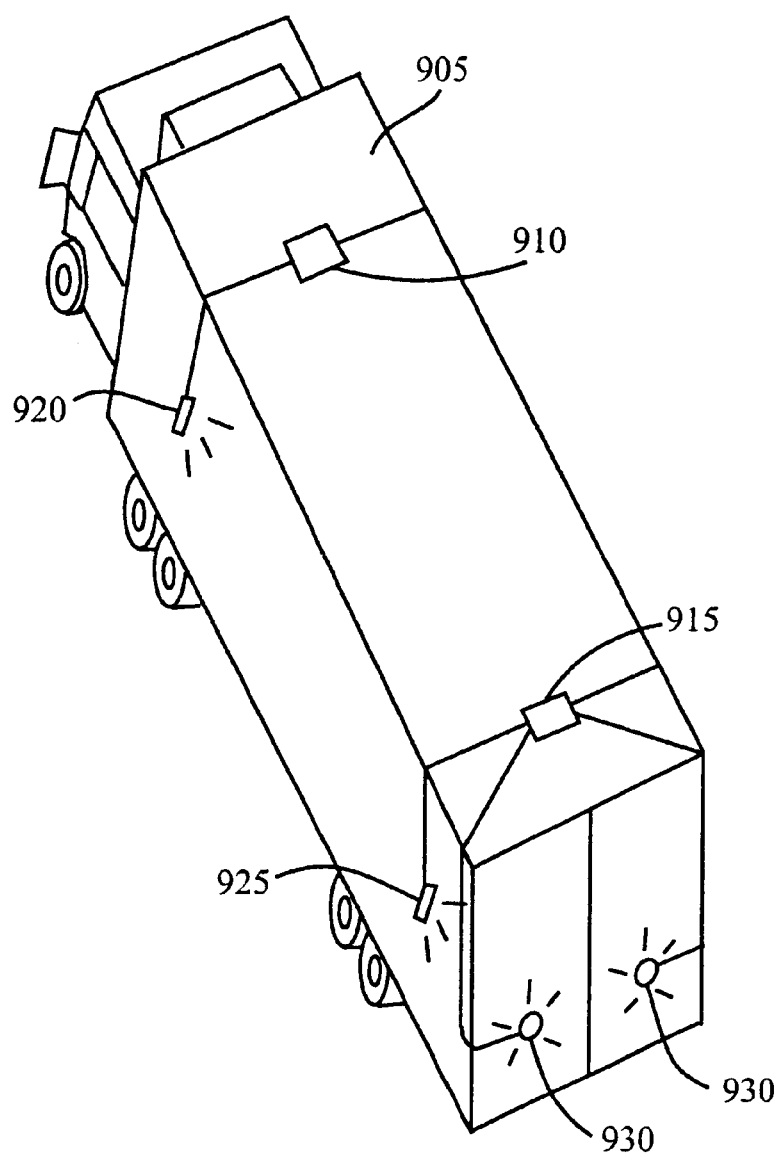
FIG. 9 is a view of yet another embodiment of the present invention in which centralized solar panels provide power to one or more remote vehicle signal indicators.

Referring next to FIG. 9, shown is another embodiment of the present invention in which solar panels that are physically isolated from the remote vehicle signal indicators 100 supply power to one or more remote vehicle signal indicators 100. Shown is an oversized trailer 905 of a tractor-trailer truck having a first solar panel 910, a second solar panel 915, a first left turn signal indicator 920, a second left turn signal indicator 925, and two hazard signal indicators 930 (referred to generally as remote vehicle signal indicators).

The first solar panel 910, located on the exterior top of and near the front of the oversized trailer, is coupled, e.g., with wire, to the left turn signal indicator, located on a left exterior face of the oversized trailer 905, and a right turn signal indicator (not shown) located on a right exterior face of the oversized trailer 905. The second solar panel 915, located on the exterior top of and near the rear of the oversized trailer is coupled, e.g., with wire, to the second left turn signal indicator 925, located on the left exterior face of the oversized trailer 905 and a second right turn signal indicator (not shown) located on the right exterior face of the oversized trailer 905. Additionally, the second solar panel 915 is electrically coupled to two hazard signal indicators 930 located on the rear exterior face of the oversized trailer 905.

In practice, the first solar panel 910 collects solar energy and supplies electrical energy to charge a battery supply of the first left turn signal indicator 920 and the first right turn signal indicator (not shown). The electrical energy is stored by each of the first turn signal indicators, as discussed in reference to FIG. 7, by a storage device, e.g., a rechargeable battery.

Similarly, the second solar panel 915 collects solar energy and supplies electrical energy to the second left turn signal indicator 925, the second right turn signal indicator (not shown), and the two hazard signal indicators 930 where the electrical energy is stored in each of the signal indicators, as discussed in reference to FIG. 7, by a storage device, e.g., a rechargeable battery.

Beneficially, the first solar panel 910 and the second solar panel 915 are more likely to have direct solar exposure than other embodiments; thus, providing a potentially greater source of power. In addition, collector sizes of the first and second solar panels 910, 915 do not have the same design constraints, e.g., a small or irregular shaped mounting surface, when located on a surface, e.g., the roof, of a vehicle as do solar panels which are integrated with a housing of a remote vehicle signal indicator 100. Therefore, the first and second solar panels 910, 915 may be larger than solar panels integrated with a housing of the remote vehicle signal indicators 100; thus, more energy may be collected over a shorter period of time allowing for more rapid battery recharge times.

While the invention herein disclosed has been described by means of specific embodiments and applications thereof, numerous modifications and variations could be made thereto by those skilled in the art without departing from the scope of the invention set forth in the claims.

What is claimed is:

1. A remote vehicle signal indicator system for a vehicle comprising:

a transmitter coupled to a vehicle indication signal drive line of the vehicle, the transmitter configured to wirelessly transmit a receiver activation signal corresponding to a vehicle indication signal of the vehicle indication signal drive line wherein the vehicle indication signal is selected from the group consisting of a turn signal, a brake signal, a reverse gear signal, and a hazard signal; and a remote vehicle signal indicator coupled to a surface of the vehicle outside of the vehicle, the remote vehicle signal indicator including a signal indicator display, the remote vehicle signal indicator configured to wirelessly receive the receiver activation signal from the transmitter and, in response, activate the signal indicator display.

2. The remote vehicle signal indicator system of claim 1 wherein the transmitter is configured to receive operating power from the vehicle indication signal of the vehicle indication signal drive line.

3. The remote vehicle signal indicator system of claim 1 further comprising a power supply for powering the remote vehicle signal indicator wherein the power supply is electrically isolated from any power source within the vehicle.

4. The remote vehicle signal indicator system of claim 3 wherein the power supply comprises a solar panel, wherein the solar panel provides energy to power the remote vehicle signal indicator.

5. The remote vehicle signal indicator system of claim 3 further comprising a housing containing the remote vehicle signal indicator and the power supply.

6. The remote vehicle signal indicator system of claim 1 wherein the transmitter comprises an encoder for encoding the receiver activation signal such that the receiver activation signal may be decoded only by the remote vehicle signal indicator.

7. The remote vehicle signal indicator system of claim 1 wherein the surface outside of the vehicle comprises a side view minor of the vehicle and the signal indicator display comprises a turn signal indicator display.

8. The system of claim 1, wherein the transmitter is located within the vehicle and there are no wireline connections from an interior of the vehicle to the remote vehicle signal indicator.

9. A remote vehicle signal indicator of a remote vehicle signal indicator system for a vehicle comprising:

a housing coupled to a surface of the vehicle outside of the vehicle;

a receiver within the housing, the receiver configured to wirelessly receive receiver activation signals from a transmitter coupled to the vehicle, the receiver activation signals corresponding to vehicle indication signals generated by the vehicle wherein the vehicle indication signals are selected from the group consisting of a turn signal, a brake signal, reverse gear signal and a hazard signal; and a signal indicator display coupled to the receiver and configured to display, in response to a received receiver activation signal, a remote vehicle indication signal corresponding to the vehicle indication signals generated by the vehicle.

10. The remote vehicle signal indicator of claim 9 further comprising a power supply for providing power to the receiver and the signal indicator display.

11. The remote vehicle signal indicator of claim 10 wherein the power supply comprises a solar panel, wherein the solar panel provides energy to operate the receiver, and the signal indicator display.

12. The remote vehicle signal indicator of claim 10 wherein the power supply is contained in the housing.

13. The remote vehicle signal indicator of claim 9 wherein the surface outside of the vehicle is a surface of a side view mirror and the signal indicator display comprises a turn signal indicator display.

14. The remote vehicle signal indicator of claim 9 wherein the receiver is a radio frequency receiver.

15. A transmitting device of a remote vehicle signal indicator system for a vehicle comprising:

a housing attached, to the vehicle;

a signal monitoring line coupled to a vehicle indication signal drive line of the vehicle, the signal monitoring line configured to receive vehicle indication signals from the vehicle indication signal drive line wherein the vehicle indication signals are selected from the group consisting of a turn signal, a brake signal, reverse gear signal and a hazard signal;

a transmitter within the housing and coupled to the signal monitoring line, the transmitter configured to wirelessly transmit a receiver activation signal corresponding to the vehicle indication signals of the vehicle indication signal drive line to a remote vehicle signal indicator located on a surface of the vehicle outside of the vehicle, in order to provide additional signal displays to those coupled to the vehicle indication signal drive line.

16. The transmitting device of claim 15 wherein the transmitter receives operating power from the signal monitoring line.

17. The transmitting device of claim 15 wherein the transmitter is a radio frequency transmitter.

18. The transmitting device of claim 15 wherein the transmitter comprises an encoder for encoding the receiver activation signal so that only particular receivers can decade the receiver activation signal.

19. A method of providing additional vehicle signal indicators for a vehicle comprising:

wirelessly receiving a receiver activation signal at a remote vehicle signal indicator coupled to a surface of the vehicle outside of the vehicle wherein the receiver activation signal is transmitted from the vehicle, the receiver activation signal corresponding to a vehicle indication signal generated within the vehicle wherein the vehicle indication signal is selected from the group consisting of a turn signal, a brake signal, a reverse gear signal, and a hazard signal; and displaying, in response to the wirelessly receiving, a remote vehicle indication signal corresponding to the vehicle indication signal generated within the vehicle, in order to provide additional signal displays to those provided within the vehicle.

20. The method of claim 19 further comprising:

detecting the vehicle indication signal generated within the vehicle; and transmitting from a transmitter, in response to the detecting, the receiver activation signal corresponding to the vehicle indication signal generated within the vehicle to the remote vehicle signal indicator.

21. The method of claim 20 further comprising:

powering the remote vehicle signal indicator with a power supply electrically isolated from the vehicle.

22. The method of claim 21 wherein the powering step comprises powering the remote vehicle signal indicator from solar energy received at the solar panel.

23. The method of claim 20 wherein the step of transmitting includes encoding the receiver activation signal so that unintended remote vehicle signal indicators can not decode the receiver activation signal.

24. The method of claim 20 further comprising:

deriving operating power for the transmitter from the vehicle indication signal.

* * * * *